United States Patent
Sakai et al.

(10) Patent No.: US 7,213,301 B2
(45) Date of Patent: May 8, 2007

(54) FOLDING DEVICE

(75) Inventors: Koji Sakai, Tsuruga (JP); Katsuichi Minami, Obama (JP); Takayuki Ishikawa, Tsuruga (JP); Toshio Ohie, Tsuruga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 249 days.

(21) Appl. No.: 10/965,865

(22) Filed: Oct. 18, 2004

(65) Prior Publication Data

US 2005/0115813 A1  Jun. 2, 2005

(30) Foreign Application Priority Data

Dec. 2, 2003 (JP) ............................. 2003-402608

(51) Int. Cl.
*E05F 1/08* (2006.01)

(52) U.S. Cl. .............................. 16/303; 16/330; 16/327

(58) Field of Classification Search ................ 16/303, 16/330, 312–316, 327; 455/575.3; 379/433.13; 361/680–682
See application file for complete search history.

(56) References Cited

U.S. PATENT DOCUMENTS

| | | | | |
|---|---|---|---|---|
| 1,904,207 A | * | 4/1933 | Donadeu | 16/54 |
| 4,215,449 A | * | 8/1980 | Loikitz | 16/50 |
| 5,109,571 A | * | 5/1992 | Ohshima et al. | 16/307 |
| 6,305,050 B1 | * | 10/2001 | Imai | 16/303 |
| 6,678,539 B1 | * | 1/2004 | Lu | 455/575.1 |
| 6,789,292 B2 | * | 9/2004 | Oshima et al. | 16/297 |
| 6,928,699 B2 | * | 8/2005 | Sawa | 16/312 |
| 7,006,853 B2 | * | 2/2006 | Kang et al. | 455/575.3 |
| 7,007,345 B2 | * | 3/2006 | Nakase et al. | 16/330 |
| 7,085,375 B2 | * | 8/2006 | Katoh | 379/433.13 |
| 2003/0162509 A1 | * | 8/2003 | Bae et al. | 455/90 |

FOREIGN PATENT DOCUMENTS

JP    2002-089542    3/2002

* cited by examiner

*Primary Examiner*—Chuck Y. Mah
*Assistant Examiner*—Michael J. Kyle
(74) *Attorney, Agent, or Firm*—Wenderoth, Lind & Ponack, L.L.P.

(57) ABSTRACT

A folding device can be used for various kinds of electronic apparatuses and is capable of easy processing of parts and lowering of cost. Inner cases 16 and 17 are mounted in outer case 15, which houses fixed member 1 and movable member 13. Groove portions 16A and 17A for holding movable member 13 for movement in the axial direction are provided in inner cases 16 and 17 to construct the folding device.

3 Claims, 5 Drawing Sheets

FOLDING DEVICE

FIELD OF THE INVENTION

The present invention relates to a folding device for use in various electronic apparatuses such as mobile telephones and personal computers.

BACKGROUND OF THE INVENTION

Recently, there have been made great advancements in production of miniature and light-weight electronic apparatuses such as mobile telephones and personal computers. In accordance therewith, such apparatuses having a movable housing arranged to be opened and closed with respect to a fixed housing, i.e., folding type apparatuses, are increasing in number. A folding device used for those apparatuses is required to be low in cost and easy to use. A folding device having such structure mentioned just above is disclosed in Japanese Laid-open Patent Publication No. 2002-89542.

A conventional folding device will be described below with reference to FIG. 4 to FIG. 6.

In a sectional view of the drawings, the dimension is shown elongated in the radial direction to facilitate the understanding of the relationship between a fixed cam and a movable cam.

FIG. 5 and FIG. 6 are a sectional view and an exploded view in perspective of a conventional folding device.

Metal fixed member 1 in a substantially cylindrical shape is formed with fixed portion 1A on its left-hand side face and provided with fixed cam 2 on a periphery of its right-hand side face. Fixed cam 2 comprises protruded portion 2A and two sloped portions 2B and 2C extended from protruded portion 2A toward the left and right.

Further, metal movable member 3, which is also in a substantially cylindrical shape, is arranged for rotation in an opening and closing direction with respect to fixed member 1. Movable member 3 is provided with movable cam 4 on a periphery of its left-hand side face in confronting relation with fixed cam 2.

Movable case 5, which is in a substantially cylindrical shape and made of sintered alloy, is provided with wall portion 5A sticking outward on its outer periphery and groove portion 5B on its inner periphery.

Protrusion 3A provided on the outer periphery of movable member 3 is inserted into groove portion 5B so that movable member 3 is movable in an axial direction.

Further, coil spring 6 is mounted so as to be weakly pre-compressed in a space between a right-hand side face of movable member 3 and a right-hand bottom face of movable case 5. Spring 6 urges movable member 3 leftward, and thereby, a tip end of movable cam 4 is held in resilient contact with sloped portion 2B of fixed cam 2.

Fixed member 1 is fixed to a left end portion of fixed shaft 7 in a substantially circular pillar shape.

Moreover, a right end portion of fixed shaft 7 passes through a hollowed portion of movable member 3 and spring 6 to be rotatably mounted to a right-hand face of movable case 5 by means of locking ring 8. Fixed portion 1A of fixed member 1 rotatably sticks out of the left-hand side face of movable case 5. Folding device 10 is thus constructed with fixed member 1, movable member 3, spring 6 and the like housed in movable case 5.

Fixed portion 1A of fixed member 1 of folding device 10 is fixed to fixed housing 22 while wall portion 5A of movable case 5 is fixed to movable housing 23, respectively, as shown in the perspective view of a mobile telephone of FIG. 4, for example. On the upper side of fixed housing 22, there are formed operating portion 22A made up of a plurality of keys and voice input portion 22B made up of members such as a microphone. Display portion 23A formed of an LCD and the like and voice output portion 23B formed of a speaker and the like are formed on a surface of movable member 5.

An arrow in FIG. 4 shows an opening and closing operation of movable housing 23.

Thus, the electronic apparatus is constructed by having movable housing 23 hingedly supported by folding device 10 for opening and closing with respect to fixed housing 22.

In the above structure, spring 6 urges movable member 3 downward, that is, in a closing direction when the tip end of movable cam 4 is in resilient contact with sloped portion 2B provided on the lower part of fixed cam 2, as shown in FIG. 5. Accordingly, movable housing 23 to which movable case 5 is fixed is held to be closed with respect to fixed housing 22.

In such a closing state, when movable housing 23 is opened by means of a hand, movable member 3 having protrusion 3A inserted in groove portion 5B moves toward the right in movable case 5 and rotates upward through movable case 5 fixed to movable housing 23. The tip end of movable cam 4 is then in resilient contact with upper sloped portion 2C over protruded portion 2A of fixed cam 2, so that movable member 3 is urged upward, that is, in an opening direction. Movable housing 23 is thus opened.

That is to say, rotation of movable case 5 fixed to movable housing 23 allows movable member 3 to move in the axial direction, so that the tip end of movable cam 4 would be in resilient contact with any one of sloped portions 2B and 2C of fixed cam 2.

An opening and closing operation of movable housing 23 with respect to fixed housing 22 is arranged as described above.

The opening and closing operation is carried out by holding movable cam 4 in resilient sliding contact with fixed cam 2. Therefore, fixed member 1 and movable member 3 require predetermined hardness and strength in order to prevent the cams from being worn and broken due to the opening and closing operation. Accordingly, metal such as steel or copper alloy is generally used for the above.

Movable case 5 should be formed with wall portion 5A for fixing movable case 5 to movable housing 23 and groove portion 5B for holding movable member 3 for movement in an axial direction. The shape of the above is limited so much that production of parts is difficult in pressing. Metal powder of such as iron or copper alloy is thus mixed with resin powder for sintering or the sintered material is cut so as to form movable case 5.

In the conventional folding device, however, forming movable case 5 from sintered metal powder or the like causes a problem that the number of processes for processing parts is increased, so that the folding device would be expensive.

Moreover, the conventional folding device has the problem that high precision production of thin-walled part is needed.

The invention aims to solve such conventional problems and to provide a folding device capable of easy processing of parts and lowering of cost.

SUMMARY OF THE INVENTION

The invention aims to provide a folding device comprising: a fixed member having a fixed cam disposed on a side face thereof; a movable member arranged for rotation with respect to the fixed member and having a movable cam disposed on a face thereof in confronting relation with the fixed cam; a spring for causing the movable cam and the fixed cam to be in resilient contact with each other; and an outer case in a substantially cylindrical shape for housing the above; wherein an inner case is mounted to the outer case and provided with a groove portion for holding the movable member for movement in an axial direction.

DETAILED DESCRIPTION OF THE PREFERRED EMBODIMENT

Figure 1:
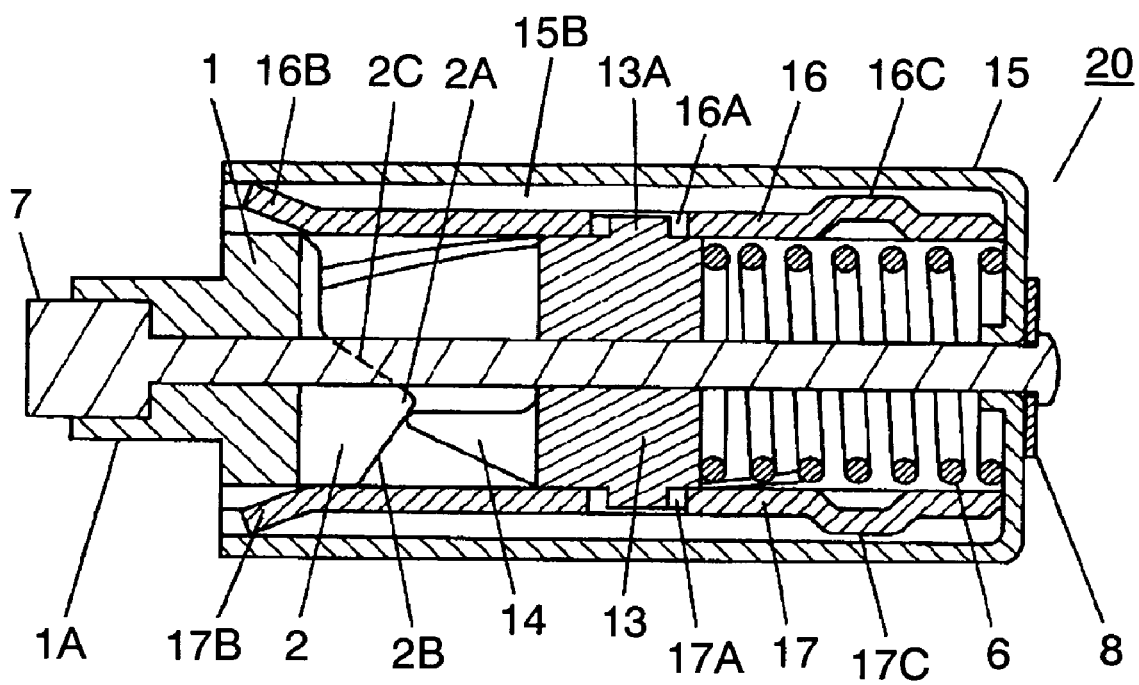
FIG. 1 is a sectional view of a folding device according to an embodiment of the invention.

An embodiment of the invention will be described below with reference to FIG. 1 to FIG. 4. The drawings are schematic views and not intended to show each dimension and position exactly. In the sectional view in the drawings, dimensions in the radial direction are shown increased to make a relationship between a fixed cam and a movable cam easy to understand. A mobile telephone is shown as an example of electronic apparatuses that can incorporate the invention. The invention is, however, not limited to the above.

Corresponding components to those of the configurations described in the background art are denoted by like reference numerals and detailed description of the same will be simplified.

Embodiment

Figure 2:
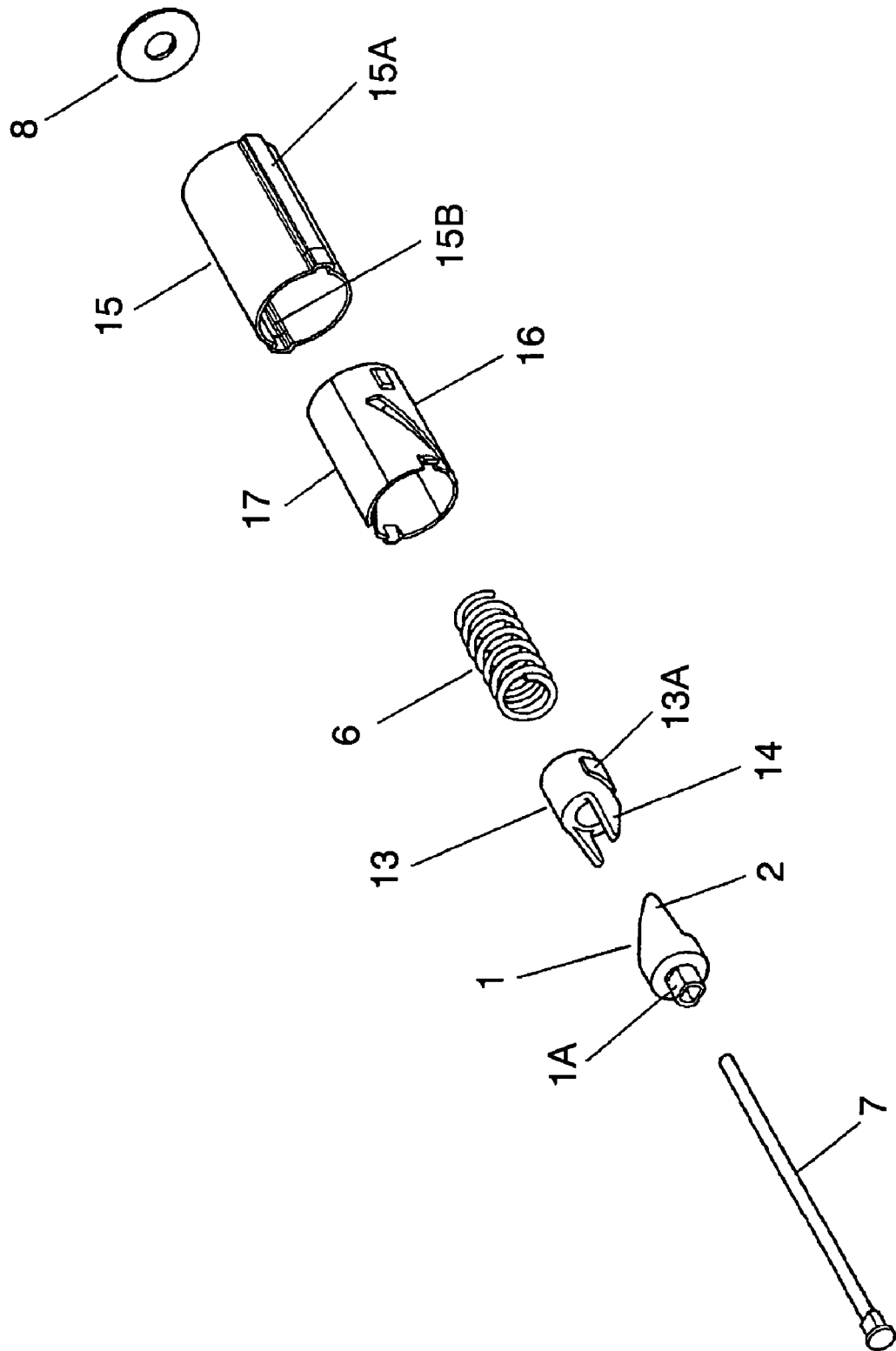
FIG. 2 is an exploded view in perspective of the folding device according to the embodiment of FIG. 1.

As shown in FIG. 1 and FIG. 2, fixed member 1 is formed of an alloy in a substantially cylindrical shape and made of steel, copper or the like. Fixed member 1 is formed with fixed portion 1A on its left-hand side face and provided with fixed cam 2 on an outer periphery of its right-hand side face.

Fixed cam 2 comprises protruded portion 2A and two sloped portions 2B and 2C extended from protruded portion 2A toward the left and right.

Movable member 13 similarly in a substantially cylindrical shape and made of metal is arranged for rotation in an opening and closing direction with respect to fixed member 1. Movable member 13 is provided with movable cam 14 on an outer periphery of its left-hand side face in confronting relation with fixed cam 2. Movable member 13 is further provided on its outer periphery with a plurality of protrusions 13A sloped with respect to the axial direction.

In outer case 15 in a substantially cylindrical shape and formed from a metal plate such as steel or copper alloy, inner cases 16 and 17, which are in a substantially arc shape and also formed from a metal plate, are opposingly mounted.

Figure 3:
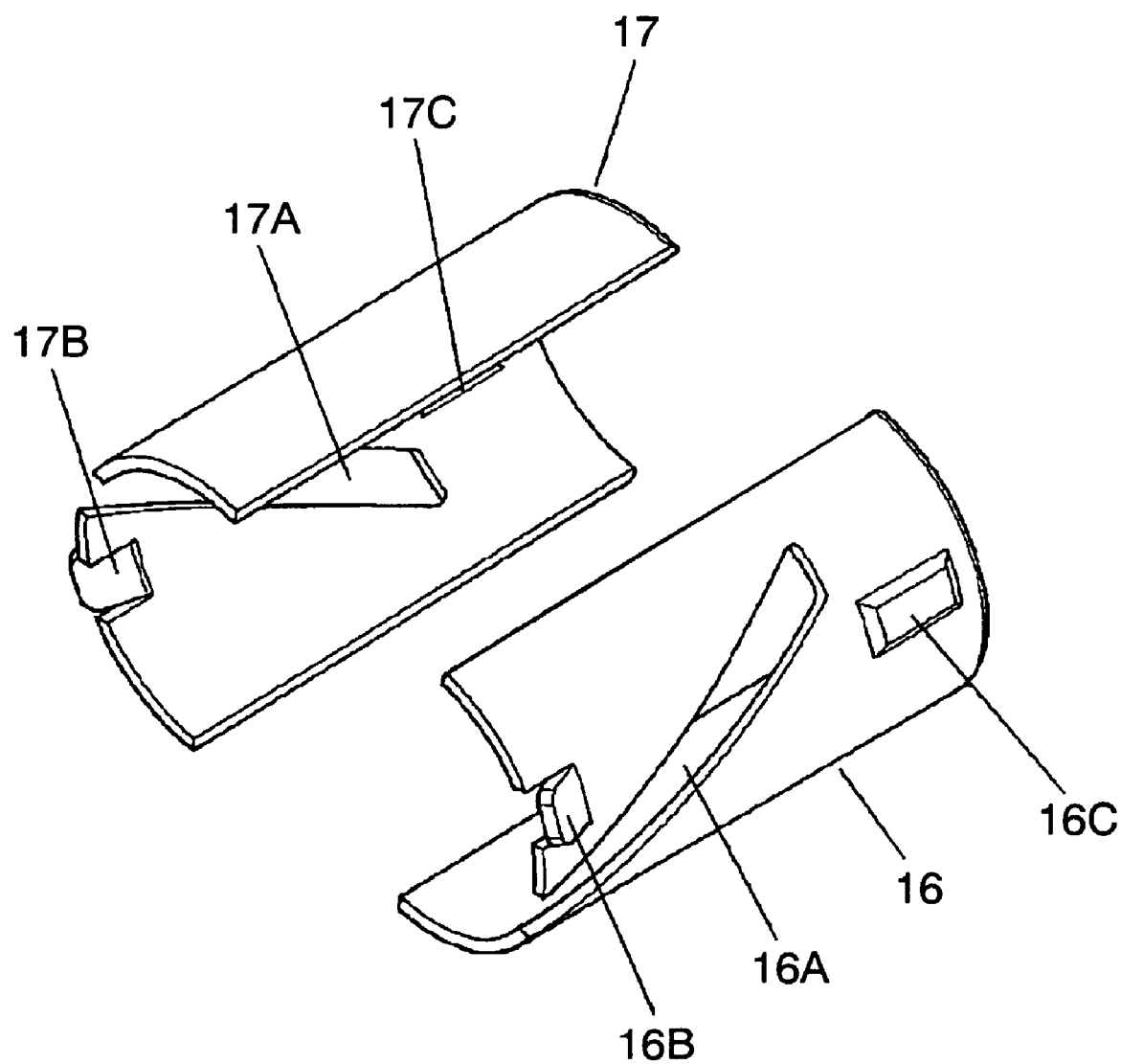
FIG. 3 is a perspective view of a part of the folding device according to the embodiment of FIG. 1.

As shown in FIG. 3, groove portions 16A and 17A sloped with respect to the axial direction are provided in inner cases 16 and 17, respectively.

Protrusions 13A are inserted into groove portions 16A and 17A to hold movable member 13 for movement in the axial direction.

Further, outer case 15 is provided on its outer periphery with wall portion 15A sticking outward. Inner cases 16 and 17 are provided with a plurality of convex (i.e., protruding) portions 16B, 16C, 17B and 17C sticking outward, which are inserted into concave (i.e., recessed) portions 15B disposed on the inner circumferential side of wall portion 15A. Inner cases 16 and 17 are thus fixed in outer case 15 without coming out in the axial and rotational directions and fluttering.

Weakly pre-compressed coil spring 6 is mounted between a right-hand face of movable member 13 and a right-hand bottom face of outer case 15.

Spring 6 urges movable member 13 toward the left so that a tip end of movable cam 14 would be in resilient contact with sloped portion 2B of fixed cam 2.

Fixed member 1 is fixedly attached to a left end portion of fixed shaft 7 having a substantially circular pillar shape. A right end portion of fixed shaft 7 passes through a hollowed portion of movable member 13 and spring 6 to be rotatably mounted to a right-hand side face of outer case 15 by means of locking ring 8.

Further, fixed portion 1A of fixed member 1 rotatably sticks out of the left-hand side face of outer case 15. Folding device 20 is thus constructed with inner cases 16 and 17, which hold fixed member 1, spring 6 and movable member 13 for movement in the axial direction, and the like housed in outer case 15.

That is to say, in folding device 20 in the embodiment, wall portion 15A fixed to an electronic apparatus is provided in outer case 15 while groove portions 16A and 17A, which hold movable member 13 for movement in the axial direction, and the like are provided in inner cases 16 and 17. Accordingly, the structure is so simple that outer case 15 and inner cases 16 and 17 can be respectively produced by pressing a metal plate.

Figure 4:
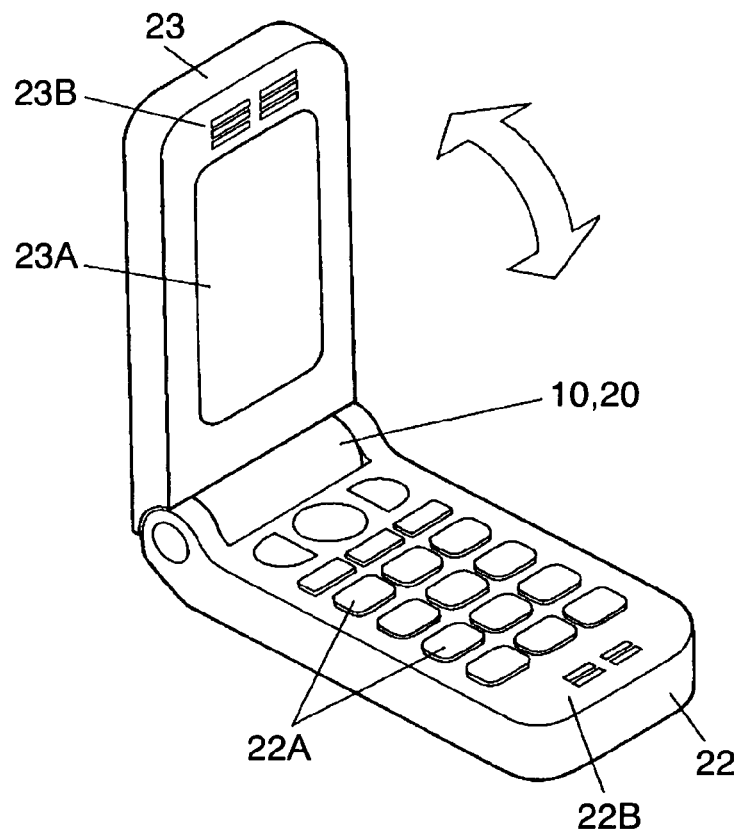
FIG. 4 is a perspective view of a mobile telephone as an example of an electronic apparatus.
Figure 5:
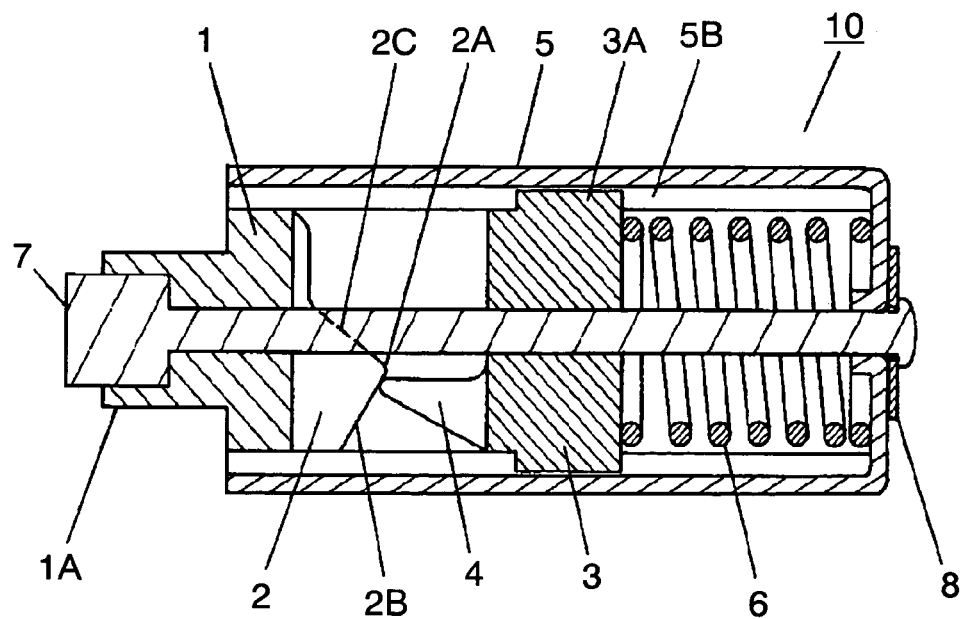
FIG. 5 is a sectional view of a conventional folding device.
Figure 6:
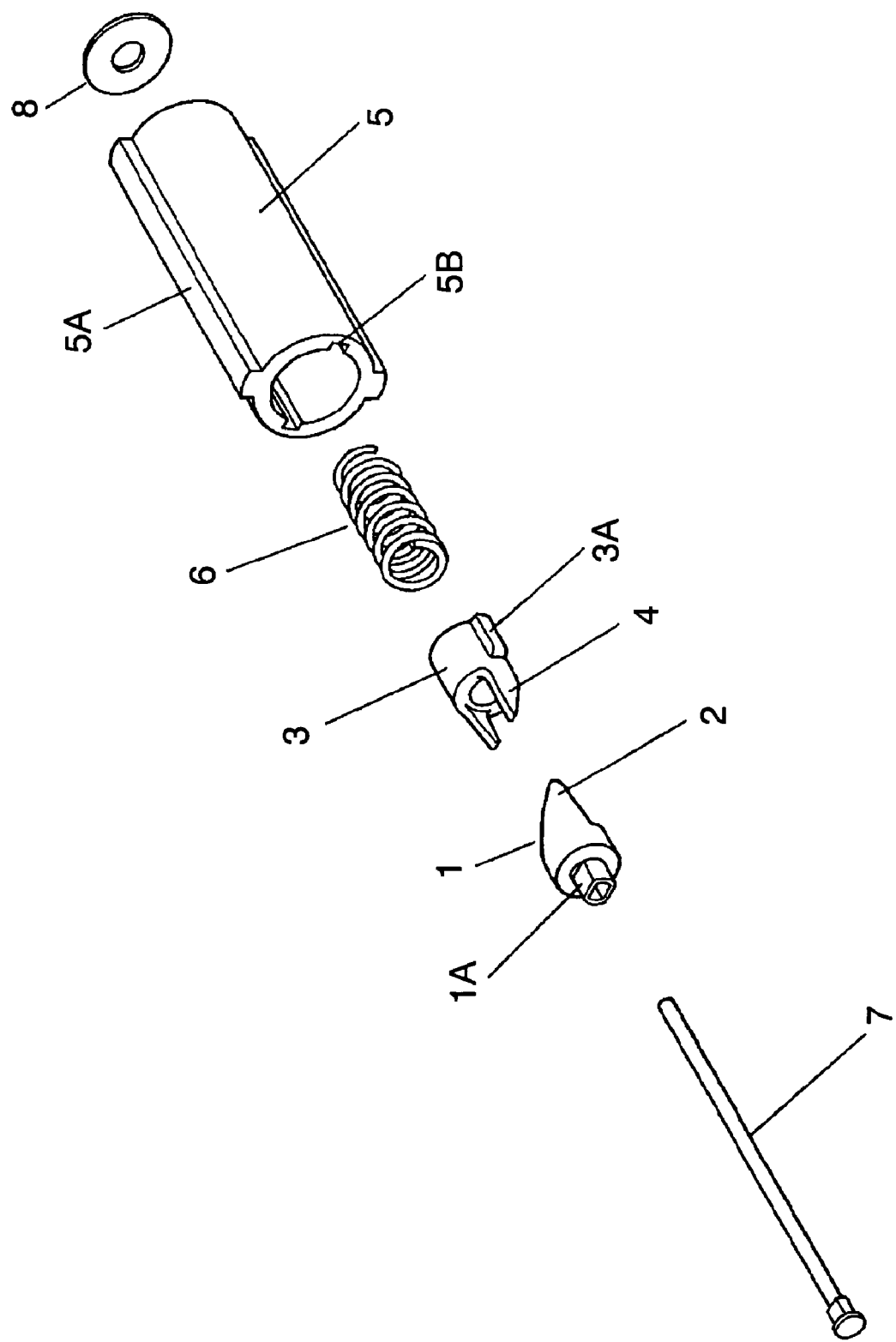
FIG. 6 is an exploded view in perspective of the conventional folding device.

Folding device 20 constructed as described above can be mounted to an electronic apparatus as shown in a perspective view of a mobile telephone of FIG. 4, for example.

Fixed portion 1A of fixed member 1 is fixedly attached to fixed housing 22 while wall portion 15A of outer case 15 is fixedly attached to movable housing 23. On the upper face of fixed housing 22, there are formed operating portion 22A made up of a plurality of keys and voice input portion 22B made up of members such as a microphone. Display portion 23A formed of an LCD and the like and voice output portion 23B formed of a speaker and the like are formed on a surface of movable housing 23. Thus, the electronic apparatus is constructed by having movable housing 23 hingedly supported by folding device 20 for opening and closing with respect to fixed housing 22.

In the above structure, spring 6 urges movable member 13 downward, that is, in a closing direction when the tip end of movable cam 14 is in resilient contact with sloped portion 2B provided on the lower part of fixed cam 2, as shown in FIG. 1. Accordingly, movable housing 23 to which outer case 15 is fixed is held to be closed with respect to fixed housing 22.

In such a closing state, when movable housing 23 is opened by means of a hand, movable member 13 having protrusion 13A inserted in groove portions 16A and 17A moves toward the right in inner cases 16 and 17 and rotates upward through outer case 15 fixed to movable housing 23.

Here, protrusion 13A and groove portions 16A and 17A are provided so as to slant with respect to the axial direction. Accordingly, inner cases 16 and 17, and outer case 15 move with respect to movable member 13 in the rotational direction much more than the case of protrusion 13A and groove portions 16A and 17A provided parallel to the axial direction.

The tip end of movable cam 14 then becomes in resilient contact with upper sloped portion 2C over protruded portion 2A of fixed cam 2 to urge movable member 13 upward, that is, in the opening direction. Movable housing 23 to which outer case 15 is fixedly attached is thus opened.

That is to say, rotation of outer case 15 fixed to movable housing 23 allows movable member 13 to move in the axial direction, so that the tip end of movable cam 14 is in resilient contact with any one of sloped portions 2B and 2C of fixed cam 2. An opening and closing operation of movable housing 23 with respect to fixed housing 22 is arranged as described above.

According to the embodiment, the folding device is constructed by mounting inner cases 16 and 17 in outer case 15, which houses fixed member 1 and movable member 13, and by providing in inner cases 16 and 17 groove portions 16A and 17A for holding movable member 13 for movement in the axial direction. Accordingly, the structure is so simple that outer case 15 and inner cases 16 and 17 can be respectively produced by pressing a metal plate such as steel, copper alloy or the like.

It is thus possible to provide a folding device whose parts can be easily processed and which is low in cost.

Further, providing groove portions 16A and 17A of inner cases 16 and 17 that slant with respect to the axial direction allows inner cases 16 and 17, and outer case 15 to move largely with respect to movable member 13 in the rotational direction. Therefore, an opening and closing angle of the folding device can be widened.

Moreover, concave portion 15B and convex portions 16B, 16C, 17B, and 17C and the like are provided in outer case 15 and inner cases 16 and 17, respectively, so that inner cases 16 and 17 can be fixedly attached to outer case 15 by means of the concave portion and the convex portions. Inner cases 16 and 17 can thus be easily mounted to outer case 15 without fluttering in the axial and rotational directions or the like.

In the description made above, such a configuration has been described in which two inner cases of inner cases 16 and 17 are provided for easy insertion in and mounting to outer case 15. In other cases, inner cases 16 and 17 may be formed into one body so that the one inner case can be mounted to outer case 15. Effects of the invention can be summed up as follows.

According to the invention, a folding device is constructed by mounting an inner case in an outer case, which houses a fixed member and a movable member, and by providing in the inner case groove portions for holding the movable member for movement in the axial direction, so that structures of the outer case and the inner case can be simplified. Thus, the folding device can be produced by pressing a metal plate formed of steel, copper alloy or the like, for example, and thereby, easy processing of parts thereof and lowering of cost can be achieved.

Further, according to the invention, the groove portion of the inner case is provided at a slant with respect to the axial direction, so that the outer case can move largely with respect to the movable member in the rotational direction. This allows an opening and closing angle of the folding device to be widened.

Moreover, a convex portion and a concave portion are respectively provided in the outer case and the inner case to fixedly attach the inner case to the outer case by means of the convex portion and the concave portion. The inner case can thus be easily mounted to the outer case without fluttering in the axial and rotational direction or the like.

As described above, according to the invention, the inner case and the outer case can be produced by pressing a metal plate. Accordingly, it is possible to provide a light-weight folding device capable of easy processing of parts and lowering of cost.

The folding device can be used for various kinds of electronic apparatuses.

What is claimed is:

1. A folding device comprising: an outer case in a substantially cylindrical shape; an inner case non-rotatably mounted in the outer case; a fixed member mounted in the inner case and having a first cam disposed on a side face thereof; a movable member mounted in the inner case and arranged for rotation with respect to the fixed member, said movable member having a second cam disposed on a face thereof in confronting relation with the first cam; and a spring mounted in the inner case and arranged to cause the second cam and the first cam to be in resilient contact with each other; wherein the inner case is provided with a groove portion, and the movable member is engaged with the groove portion so that the movable member is movable relative to the inner case in an axial direction; and wherein the groove portion is inclined with respect to the axial direction.

2. The folding device according to claim 1, wherein any one of the outer case and the inner case is provided with a protruding portion while the other is provided with a recessed portion so that the inner case is fixedly attached to the outer case by the protruding portion and the recessed portion.

3. The folding device according to claim 1, wherein the movable member has an outwardly projecting protrusion engaged in said groove portion.

* * * * *